United States Patent [19]
Geul

[11] 3,888,592
[45] June 10, 1975

[54] APPARATUS FOR MEASURING WHEEL ANGLES OF VEHICLES, PARTICULARLY MOTOR VEHICLES

[75] Inventor: Herman Robert Geul, Leiden, Netherlands

[73] Assignee: Sun Electric Corporation, Chicago, Ill.

[22] Filed: Sept. 13, 1973

[21] Appl. No.: 396,990

[30] Foreign Application Priority Data
Sept., 1972 Netherlands.................. 7212387

[52] U.S. Cl................................ 356/155; 356/170
[51] Int. Cl. .......................................... G01b 11/275
[58] Field of Search .......... 356/155, 141, 152, 170; 33/203, 203.18

[56] References Cited
UNITED STATES PATENTS

| | | | |
|---|---|---|---|
| 3,393,455 | 7/1968 | MacMillan | 356/155 |
| 3,630,623 | 12/1971 | Schirmer | 356/155 |
| 3,709,609 | 1/1973 | Spengler et al. | 356/155 |
| 3,782,831 | 1/1974 | Senften | 356/155 |

*Primary Examiner*—Ronald L. Wibert
*Assistant Examiner*—Richard A. Rosenberger
*Attorney, Agent, or Firm*—Molinare, Allegretti, Newitt & Witcoff

[57] ABSTRACT

The invention relates to a device for measuring the wheel angle on vehicles comprising an optical system, cooperating with the related wheel, for forming on an image plane one or more marks or patterns, with one or more light sensitive elements situated in the image plane, and with means for effecting a relative movement between one or more of the light sensitive elements and the mark(s) or pattern(s), respectively, caused by an angular displacement of a projector with respect to a reference position, while during this movement signals are generated in reference positions to be used for determining the wheel angle concerned.

16 Claims, 24 Drawing Figures

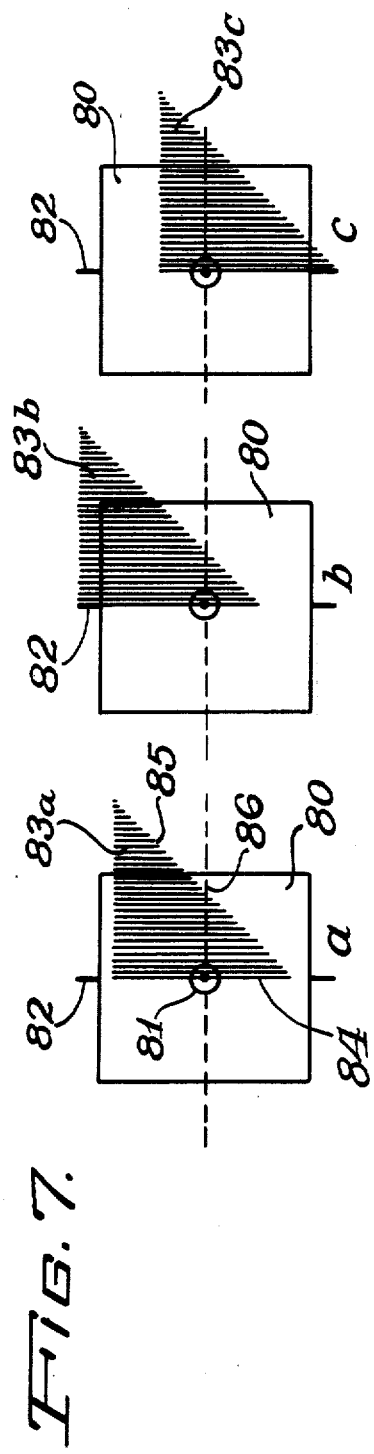

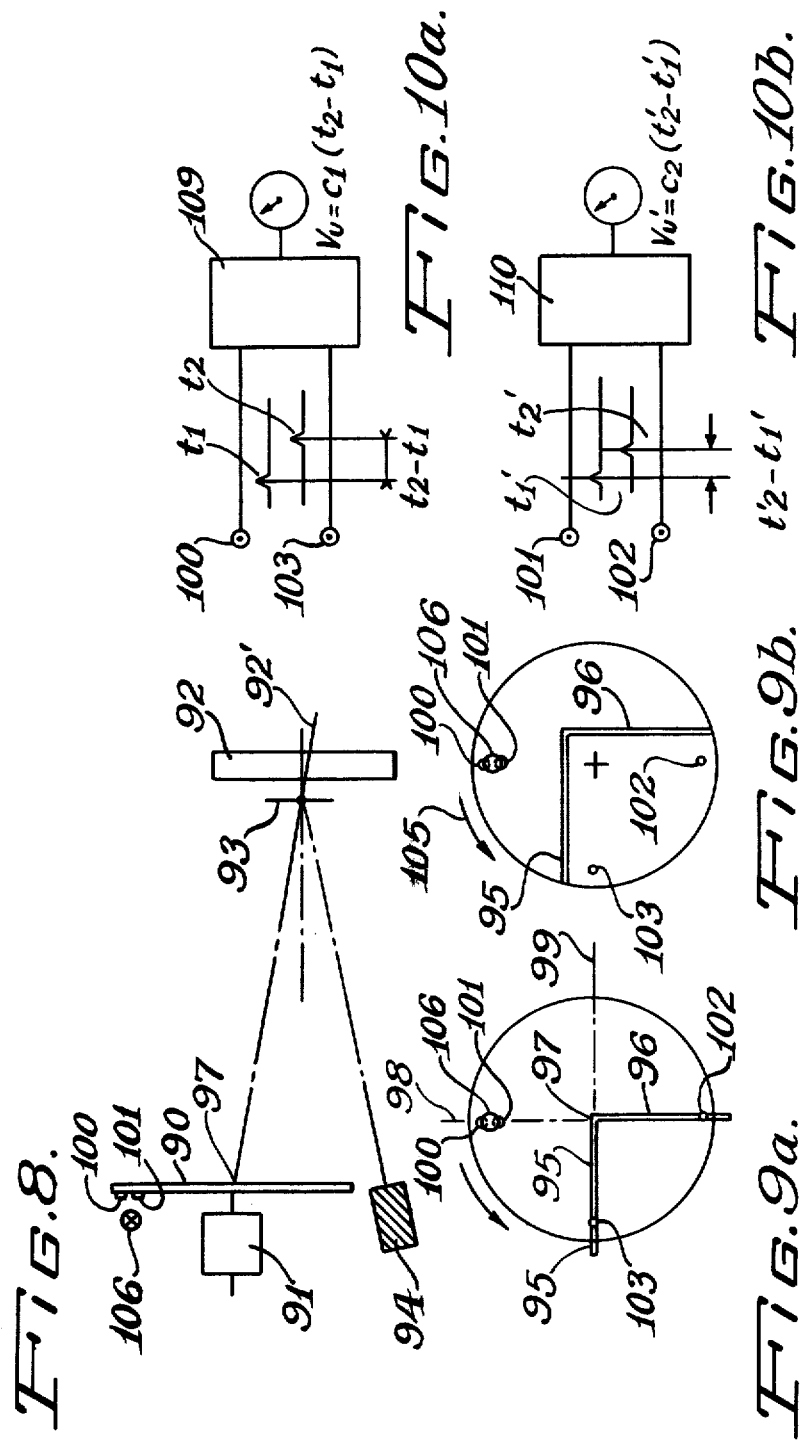

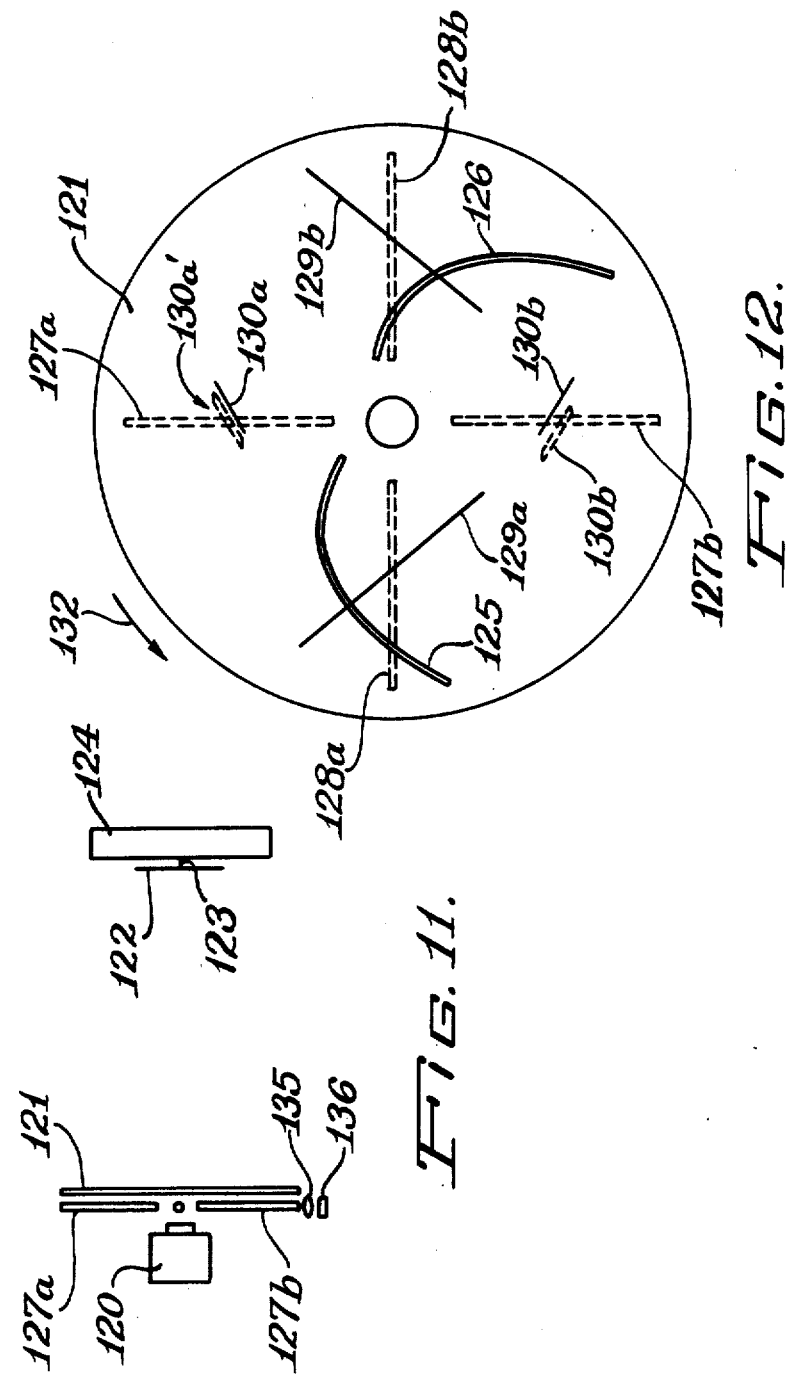

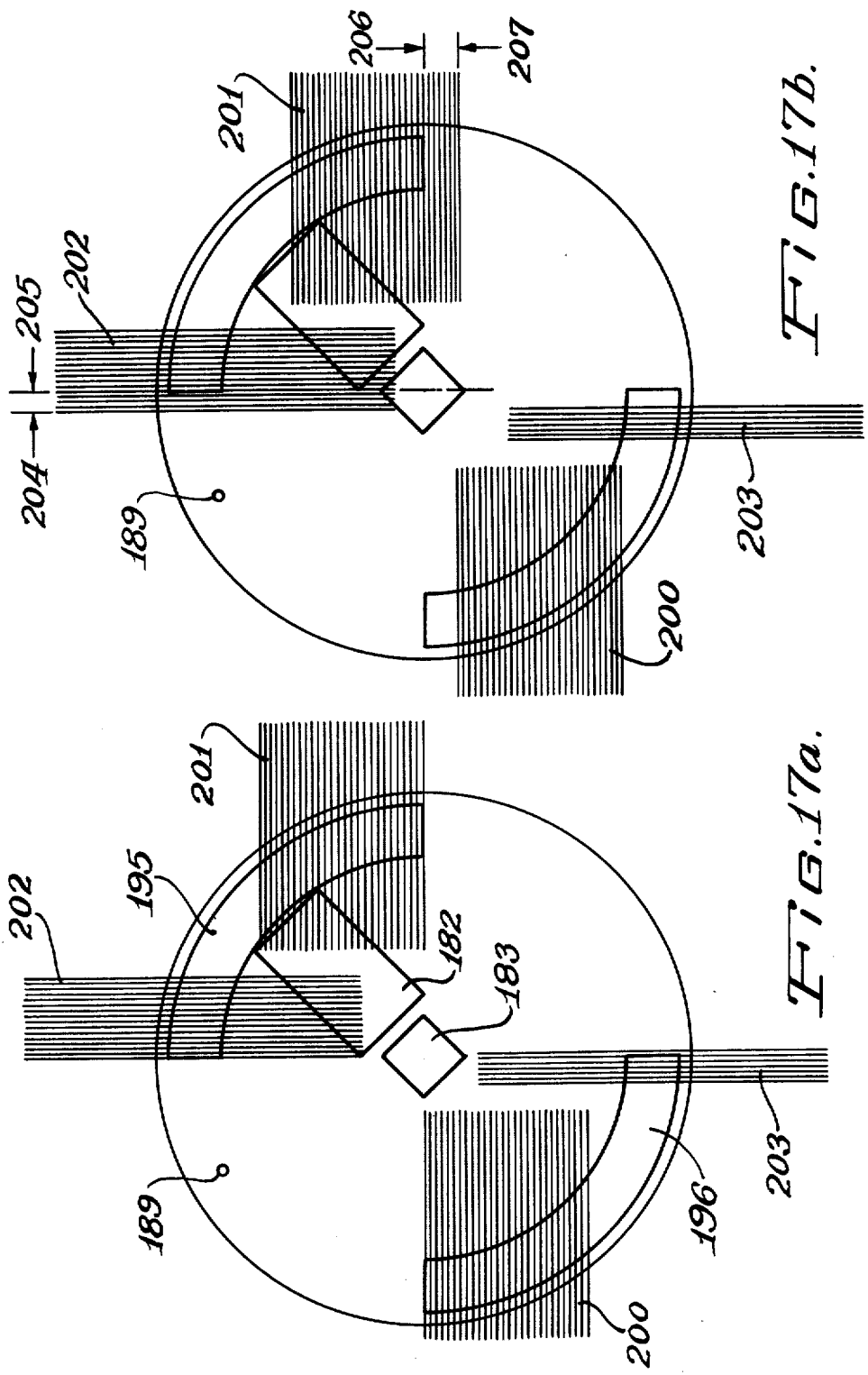

APPARATUS FOR MEASURING WHEEL ANGLES OF VEHICLES, PARTICULARLY MOTOR VEHICLES

BACKGROUND OF THE INVENTION

Generally, such apparatus, particularly as used in modern automatic diagnostic systems for motor vehicles, and as developed by the German firm of Bosch, is known. The movements of the pattern over the image plane, illuminating light sensitive elements is effected by swinging the projector around a horizontal and/or a vertical axis, or around an axis which makes an angle with the horizontal. The wheel angles to be measured are determined from the position of the projector at the reference moments, determined when reference lines of the pattern strike certain light sensitive elements.

This known apparatus has the drawback that the electrical signals which represent the wheel angle and which are to be used to control indicating devices or logical circuits must be derived as a function of the position of the projector itself, necessitating a mechanical coupling between the projector and position sensing elements which deliver such signals. This results in a complicated system of which the accuracy depends largely upon the accuracy of the mechanical coupling between the projector and the position sensing elements.

SUMMARY OF THE INVENTION

The invention aims to provide an apparatus of the above-mentioned kind but having a much more simple structure and a greater accuracy. The invention is based upon the understanding that by means of a suitable pattern, projected by the projector, striking the light sensitive elements, these elements emit signals which are counted for directly determining the wheel angle.

According to the invention, the signals, emitted by the light sensitive elements, are themselves directly used for determining the wheel angles which are thus not determined from the position of the projector at reference moments.

A preferred embodiment of the invention comprises a projector for projecting, via a mirror, a plurality of equidistantly spaced marks on the image plane, which is situated on the same side as the mirror and which contains at least one light sensitive element covered by the marks, while either the projector and the image plane or the mirror can turn through a limited angle around a horizontal respectively vertical axis.

Another possible embodiment of the invention for measuring wheel angles on vehicles, comprising an optical system cooperating with the related wheel for forming one or more marks or patterns on an image plane, with one or more light sensitive elements situated in the image plane and with means for causing a relative movement between one or more of the light sensitive elements and the mark(s) or pattern(s), respectively, while during this movement signals are generated from the values from which in reference positions the related wheel angle can be derived, is constructed in such a way that the relative movement is obtained by moving the light sensitive element(s) with respect to the image formed on the image plane, while by means of the light sensitive element(s) signals are obtained which represent the wheel angle to be measured.

BRIEF DESCRIPTION OF THE DRAWINGS

The invention is hereinafter clarified with reference to the accompanying drawings.

In the drawing:

FIG. 7 shows in front view a variant of the line configurations used in accordance with the embodiment shown in FIG. 3;

FIG. 8 illustrates the operating principle of another embodiment according to the invention;

FIGS. 9a and 9b show the line configurations used in the embodiment of FIG. 8;

FIGS. 10a and 10b illustrate the principle of reading out the results of a measurement;

FIG. 11 shows diagrammatically a side elevation of an embodiment according to the invention;

FIG. 12 shows a front view of the scanning system used therewith and the measuring lines pattern;

FIGS. 17a and 17b show a front view of the image showing surface with the measuring line configurations of this embodiment;

DESCRIPTION OF A PREFERRED EMBODIMENT

Figure 1:
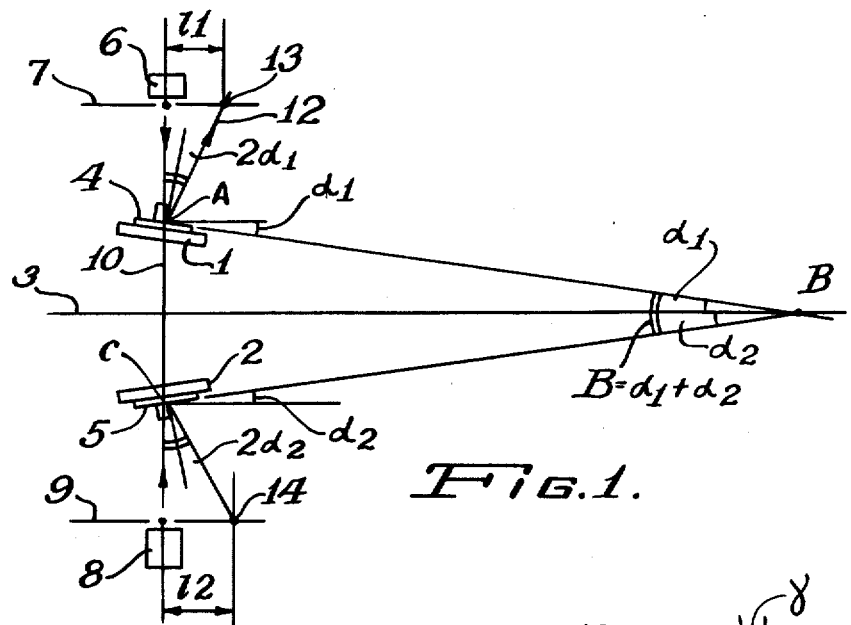
FIG. 1 is a diagrammatical plan view.
Figure 2:
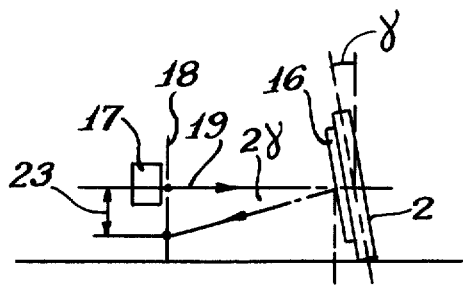
FIG. 2 is a diagrammatical side elevation of a part of the wheel suspension of a vehicle with reference to which the principle of the measurement of the wheel angle is clarified.

FIGS. 1 and 2 of the drawing show diagrammatically a plan view and front view, respectively, of a part of the wheel suspension of a motor vehicle, and serve to illustrate the principle of the wheel angle measurement according to the invention.

The front wheels 1 and 2 of a motor vehicle, the longitudinal axis of which is indicated by the line 3, in the situation represented in FIG. 1 are nearer to each other at their front side than they are at their rear side. In some motor vehicles, the front wheels are in the straight-on position parallel to each other; in that case the toe-in = 0. It also occurs in some instances that the front sides of the wheels are farther apart from each other than the rear sides; in that case the wheels have a negative toe-in (toe-out).

The toe-in can be expressed in units of length, namely, as the difference between the distance of front sides and rear sides, respectively, but it can also be expressed in degrees. In the illustrated case the toe-in in degrees corresponds to the angle A.B.C., the lines AB and CB being parallel to the wheel planes. The optical determination of the toe-in is effected as follows.

By means of suitable clamps, mirrors 4 and 5 are respectively secured to the wheels 1 and 2, the arrangement being such that the mirrors are parallel to the planes of the wheels 1 and 2, respectively. Opposite each wheel 1 and 2, respectively, is placed, at a convenient distance, the combination of a projector 6 and an image plane. In front of the wheel 1 is the projector 6 with the image plane 7 and in front of the mirror 5 is the projector 8 with the image plane 9.

The projectors 6 project, in the direction perpendicular to the longitudinal axis 3 of the vehicle according to the optical axis of the projector (indicated by the line 10), an image, e.g. a luminous spot, via a mirror 4, which makes an angle $\alpha 1$ with the direction parallel to the longitudinal axis 3 of the vehicle. The angle between the incident light ray 11 and the reflected light ray 12 will then be equal to $2\alpha$. The distance L1 between the line 10 and the point 13 on the image plane 7 is then, when the distance between the surface 7 and the mirror is known, a measure for the angle $2\alpha 1$. In an analogous way, a luminous spot projected by the projector 8 according to the optical axis via the mirror 5, which is at an angle $\alpha 2$ with the longitudinal axis of the vehicle, will be reflected on a point 14 situated at a distance L2, which is a measure for the angle $2\alpha_2$, from the line 10. From the distance $L_1, L_2$, respectively, the value of the angle $2\alpha_1$, $2\alpha_2$, respectively can be determined, the total angle of toe-in is equal to $\alpha_1$ and $\alpha_2$ and consequently to $$\frac{(2\alpha_1 + 2\alpha_2)}{2}$$

FIG. 2 shows a front view of the vehicle wheel 2, from which it is seen that the wheel plane makes an angle $\gamma$ with the perpendicular; the wheel has a positive camber. This angle $\gamma$ can likewise be determined by means of a mirror 16, secured parallel to the plane of the wheel 2, and cooperating with a projector 17 and an image plane 18. When the optical axis 19 of the projector is horizontal a luminous spot thrown by the projector on the mirror 16 will be shown on the image plane 18 at a distance 23 from the optical axis. This distance, when the distance between the image plane and the mirror is known, is a measure for the angle of camber $\gamma$.

Figure 3:
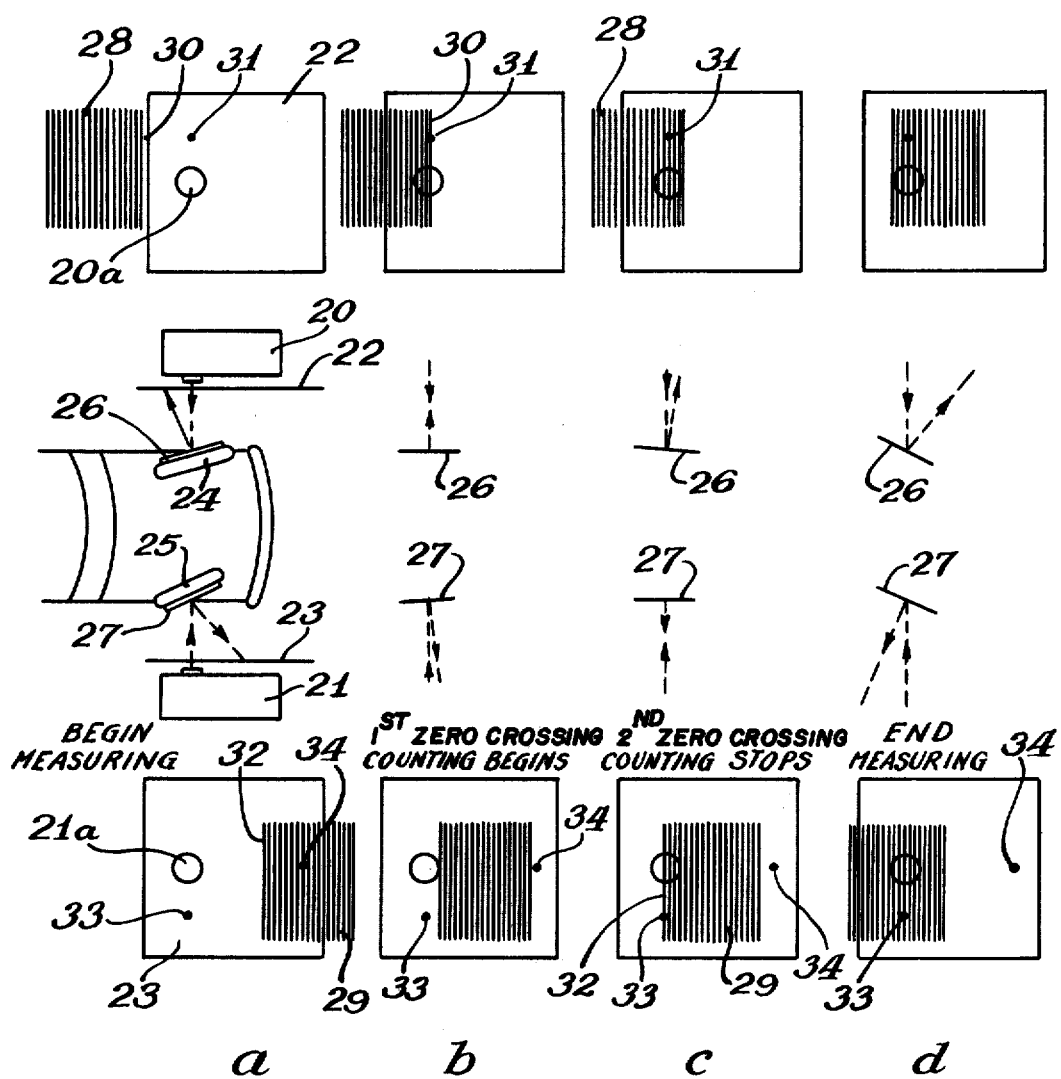
FIG. 3 shows diagrammatically a plan view of an embodiment of the device according to the invention.
Figure 4:
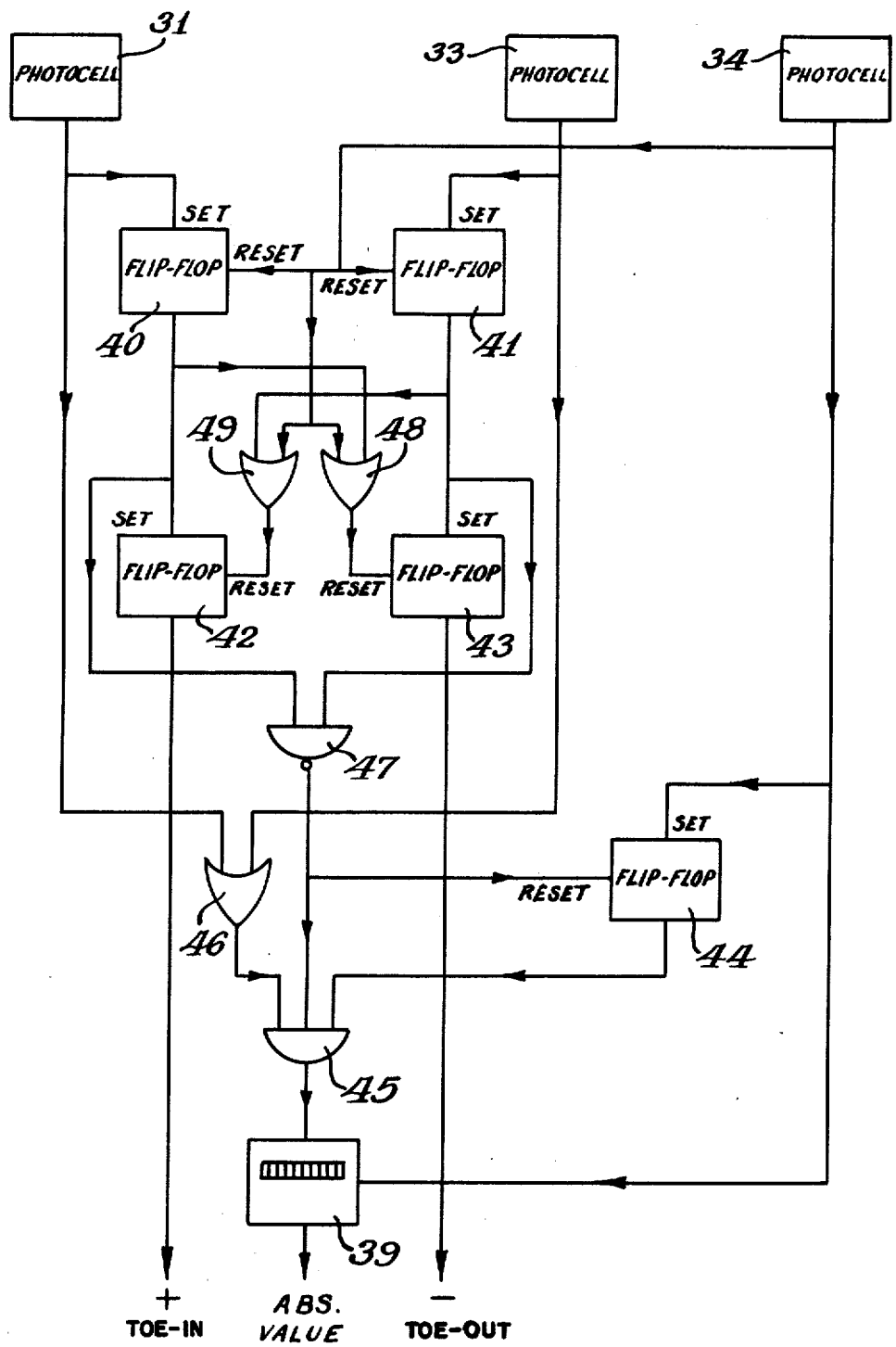
FIG. 4 is a block diagram of the electronic circuit used in the embodiment according to FIG. 3.

One basic concept of the invention is to cause a movement of one or more light sensitive elements in the image plane with respect to marks or patterns generated by the projector, and measure the wheel angle directly from the electrical signals which are generated during this movement between reference positions by the light sensitive elements. FIG. 3 shows diagrammatically an embodiment based on this principle; FIG. 4 shows a block diagram of the electronic circuit used therewith. The device according to FIG. 3 consists of two projectors 20 and 21, respectively, each with an image showing surface 22, 23, respectively, disposed in front thereof. For the sake of clarity the image showing surfaces 22, 23, respectively with the patterns shown thereon are again represented above and below the projectors 20, 21 respectively.

Each of the wheels 24 and 25, respectively, for which the camber is to be measured, carries a mirror 26, 27 respectively, which is disposed in the known way perpendicular to the wheel axis.

The two projectors 20, 21 project an image consisting of a pattern 28, 29, respectively, of vertical lines. The projectors are arranged in such a way with respect to the wheels that when the wheel 24, and as a consequence the mirror 26, are parallel to the longitudinal axis of the vehicle, the first line 30 of the pattern 28 passes through the projection center 20a and also falls on a photo-electric cell 31 in the plane 22. Similarly, for the projector 21, when the wheel 25 is directed straight-on, the first line 32 of the pattern 29 passes through the projection center 21a and also falls on the photo-electric cell in the surface 23. The effective opening of each of the photo-electric cells 31 and 33 is smaller than the mutual distance of the projected pattern lines minus a thickness of one line. In the image showing surface 23 there is furthermore provided an additional photo-electric cell 34, the purpose of which will be further described.

The device operates as follows:

Prior to the beginning of the wheel angle measurement, the steering wheel is fully turned to the left, so that the two projected images lie outside the respective projection centers and photo-electric cells. Thereupon the steering wheel is turned to the right, whereby the projected images move with respect to the photo-electric cells. At first the situation of FIG. 3b is attained in which the foremost pattern line 30 falls on the photo-electric cell 31; this photo-electric cell emits a signal which initiates the counting of the lines of the pattern 28 passing by the photo-electric cell 31. Thereupon the situation of FIG. 3 arises; the first line 32 of the pattern falls on the photo-electric cell 33; this photo electric cell gives a signal which causes the counting of the pulses produced by the photo-electric cell 31 to be terminated. The total number of pulses counted is then a measure of the angle between the two wheels 24 and 25 and consequently for the toe-in.

When the wheels have toe-out, it too is determined by counting the passing lines by means of the photo-electric cell 33.

In order to avoid errors due to the fact that the steering wheel at the start of the measuring has not been fully turned to the left, the photo-electric cell 34 is provided. This cell 34 can only be lighted (by the line of the pattern) when all pattern lines of the image concerned have been projected in the correct direction beside the projection center concerned. The function of this photo-electric cell 34, which consequently gives a signal when the initial condition is satisfied, can also be fulfilled by a switch member coupled to the rotatable plate supporting the wheels.

FIG. 4 shows a block diagram of one illustrative electronic apparatus which can be used with the above described embodiment. When the steering wheel is entirely turned to the left then the photo-electric cell 34 is lighted, whereby the counter 39 and the flip-flops 40, 41, 42, 43 are reset, while the flip-flop 44 is set. Now the counter 39, when the steering wheel is turned back, can record, via the AND gate 45 and the OR gate 46, passages of pattern lines detected by the photo-electric cells 31 and 33. The first pulse of each of these cells sets the flip-flops 40, 41, respectively. As soon as the two flip-flops change state, the AND gate 45 is immediately closed via the AND gate 47 and, moreover, the flip-flop 44 is reset. Hereupon the counting is discontinued and the counter displays in digital value the absolute value of the angle measured. When the first flip-flop 40 or 41 changes, one of the flip-flops 42, 43, respectively is set and the further changing over of the second of the latter flip-flops is blocked by keeping the same reset via the OR gate 48, 49, respectively. The changing over one of the flip-flops 42 or 43 determines the sign of the angle (toe-in or toe-out).

If desired, the cycle can be restarted by turning the steering wheel again fully to the left.

In the embodiment described hereinbefore, the movement of the light sensitive elements with respect to the projected pattern can be achieved by a movement of the wheels. It obviously also is possible to keep the wheels with the mirrors secured thereto stationary and to cause the projector, which furnishes the pattern image, to perform a movement.

Figure 5:
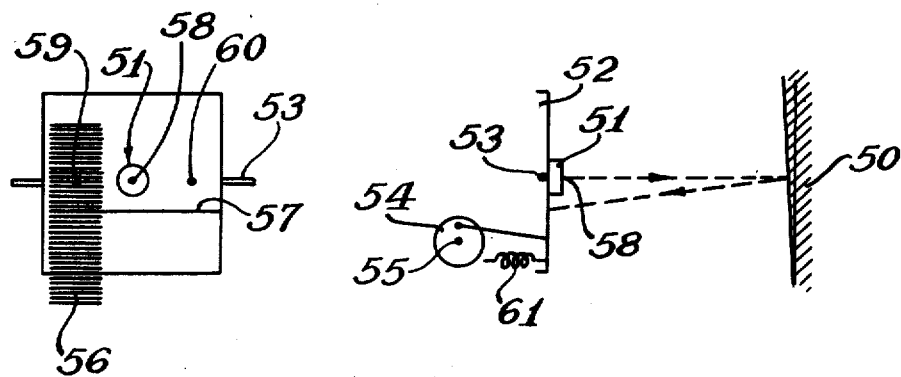
FIG. 5 shows in front view and side elevation, respectively, another embodiment of the invention.

An embodiment operating in accordance with this principle is diagrammatically represented in side elevation in FIG. 5; by means of this embodiment the angle of toe-in can be measured.

The mirror 50 is fixedly secured to a front wheel, not shown, so as to be perpendicular to the wheel axle. The angle which the mirror makes with the perpendicular corresponds with the angle of camber. Arranged in front of the mirror 50 is the combination of a diagrammatically indicated projector 51 with the image plane 52. This combination is capable of rotating through a limited angle around a horizontal axis 53, which rotation is caused by the eccentric 54 with driving shaft 55 coupled to a motor (not shown).

The projector 51 furnishes a pattern 56 of horizontal lines, one of which, the line 57, is longer than the others. The whole is arranged in such a way in front of the mirror that, when the optical axes coincide prior and after reflection — which is the case in the angular position in which the optical axis of the projector 51 is perpendicular to the mirror 50 — the line 57 passes through the projection center 58.

On a horizontal line through the projection center 58 are situated two photo-electric cells 59, 60. The angle of camber is determined by counting the number of impulses furnished by the photo-electric cell when the lines of the screen 56 pass the following reference positions:

1. image plane with photo-electric cells vertical, and
2. image plane with photo-electric cells parallel to mirror 50.

The first reference position can be observed by mechanical means. The second reference position is observed when the line 57 passes by the photo-electric cell 60, since then the emitted ray and the ray, reflected by the mirror coincide. This system can also be used for measuring toe-in angles; in that case the axis of tilt 53 should be vertical.

Clearance, if any, can be eliminated by means of the spring 61.

During the measurement the eccentric 54 performs a complete revolution so that the projector describes a to and fro tilting movement and is alternately directed upwards and downwards, starting from and returning to the horizontal position. When the zero line, after a half revolution of the eccentric — the projector axis being horizontal again and the image plane vertical — has not yet passed by, counting starts again from this reference moment.

Figure 6:
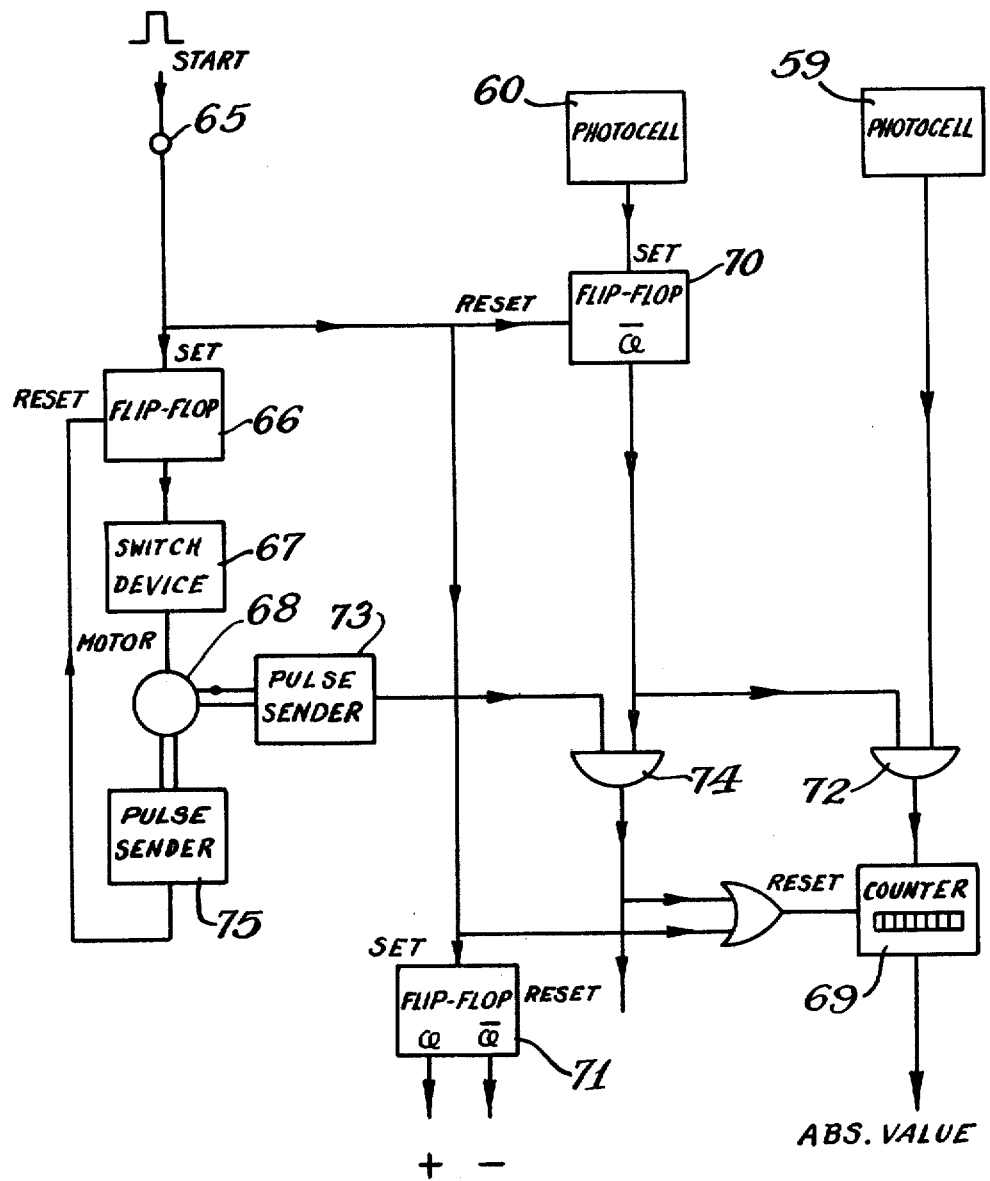
FIG. 6 is a block diagram of the electronic circuits used in the embodiment of FIG. 5.

A count during the first or second half revolution of the eccentric 54 determines whether the measured angle is positive or negative. The illustrative electronic apparatus to be utilized in this system is represented in the block diagram of FIG. 6. A pulse on the starting input 65, e.g. coming from a push button or a program card reader sets the flip-flop 66, whereby, via the switch device 67, (e.g. an electronic relay) the eccentric driving motor 68 is energized. The same starting pulse resets the counter 69 and the flip-flop 70, and sets the flip-flop 71.

The passages of the pattern lines detected by the photo-electric cell 59 are recorded via the AND gate 72 by the counter 69 until the passage to the zero line is detected by the photo-electric cell 60 and, as a consequence, the flip-flop 70 changes and the AND gate 72 is closed.

The digital result of the counting, representing the absolute value of the angle to be measured, is indicated at the output of the counter 71. After a half revolution of the eccentric the pulse sender 73 resets the counter 69 and the flip-flop 71 via the AND gate 74, if the zero line had not yet been detected by the photo-electric cell 60, so that the AND gate 74 was still open. Thereupon counting is resumed until the zero line passes the photo-electric cell 60.

The sign of the angle is determined by the condition of the flip-flop at the end of the measurement.

After a complete revolution of the flip-flop 66 the pulse sender 75 is reset, whereupon the motor 68 stops.

In describing the embodiment according to FIG. 5, it has been stated that due to the vertical arrangement of the axis of tilt 53, this embodiment is suitable for measuring toe-in or toe-out. When a screen line configuration with wedge-shaped limitations is used, then it is also possible to determine the camber by such a measurement.

FIG. 7 represents a front view of an image plane 80, while behind it and perpendicular thereto is disposed a projection which can turn together with the plane 80 around the vertical axis 82 and cooperate with the conventional wheel mirror. The configuration projected by the projector 81 consists of the vertical lines 83; this configuration has a vertical limit 84 and a slanting limit 85. The whole is adjusted in such a way that in a vertical position of the wheel mirror, so at an angle of camber 0, a known point of the wedge, e.g. halfway the height, denoted by the reference numeral 86, is shown via the mirror at the level of the center of projection 81. In dependence of the magnitude and the sign of the camber the configuration shown on the image plane 80 will be represented with respect to the situation according to FIG. 7a, upwards (FIG. 7b) or downwards (FIG. 7c).

The determination of the camber is provided by tilting the projector and mirror through an angle such that the whole configuration moves past the center of projection. In the case according to FIG. 7b, fewer pattern lines will be counted in case of a full tilting movement of the projector and image plane than in the case according to FIG. 7a; in the case according to FIG. 7c, more pattern lines will be counted. The number of counted lines is a measure for the camber.

As is shown in the figures, the light sensitive element is disposed in the center of projection 81, which is advantageous in that in principle errors in measurement do not occur.

The relative movement of the scanner with respect to lines also can proceed according to a curved line, as in the embodiment according to the FIGS. 8 and 9. This system is produced as follows:

A disc 90 is driven in rotation by a motor 91 and is arranged in front of a vehicle, one front wheel of which is shown, to which a mirror 93 is coupled in such a way that the surface of the mirror is perpendicular to the center line of the wheel. A projector 94 cooperates with the disc 90 and the mirror 93, the projector 94 projecting via the mirror 93 on the disc 90 a configuration consisting of a horizontal line of light 95 and a vertical line of light 96 intersecting the former. The whole is adjusted in such a way that the situation according to FIG. 9a arises in which the point of intersection of the line 95 and the line 96 coincides with the center 97 of the disc, the line 96 lies on the vertical line 98 through the center and the horizontal line of light 95 lies on the horizontal line 99 through the center when the mirror 93 is vertical and parallel to the longitudinal axis of the vehicle. Depending upon the sign and the magnitude of the toe-in and its angle, the line of light 96 will come to lie on the left hand side or the right hand side of the vertical line 98 and the line of light 95 will come to lie above or below the horizontal line 99.

FIG. 9b shows the situation which arises in case of a positive toe-in and a negative camber.

The displacement of the lines 95, 96, respectively, with respect to the situation according to FIG. 9a is, when the distance between the image plane 90 with the projector 94 on the one hand and the mirror 93 on the other hand is known, a measure for the toe-in, camber, respectively. This deviation is determined as follows:

Provided on the back side of the disc 90 are two photo-electric cells 100, 101, respectively, which in the depicted position of the disc are lighted by the lamp 106.

If need be, these two cells may be replaced by a single cell. These photo-electric cells are situated on the vertical line 98. Likewise on this line, but diametrically opposite the cells 100 and 101, the disc carries on its front side the photo-electric cell 102, while further on the front side of the disc the cell 103 is provided on the horizontal line 99. When the disc rotates at a constant speed the displacements of the horizontal, vertical line of light, respectively with respect to the reference positions shown in FIG. 9a are determined from the time which lapses between the moment when the disc 90 is in the reference position shown in FIG. 9a — consequently the photo-electric cells 100 and 101 are in their upper position and lighted by the lamp 106 — and the moment when the photo-electric cells 103, 102, respectively are lighted by the line of light 95, 96, respectively. The signals emitted by the photo-electric cells are received via suitable collector rings.

The device operates as follows:

The photo-electric cells 100 and 103 are connected into a circuit serving to measure the angle of camber. This circuit is set by the signal of the photo-electric cell 100 when the same passes by the lamp 106, or by the signal of the photo-electric cell 103 when the same passes by the line of light 95 — dependent upon what occurs first — and is reset by the signal of the other photo-electric cell.

The circuit 109 then sends an output signal which is proportional with the lapse of time $t_2-t_1$ between these two events.

When the wheel is vertical, and the situation consequently is as depicted in FIG. 9a, then the photo-electric cell 100 is excited by the lamp at the same moment at which the photo-electric cell 103 is excited by the line of light 95. In that case there is no time difference and the output signal is 0 corresponding with an angle of camber 0°. In the position shown in FIG. 9b, when the direction of rotation is in the direction of the arrow 105, consequently to the left, the photo-electric cell 103 will pass by the line of light 95 before the photo-electric cell 100 is near the lamp 106. The circuit therefore is set only by the signal of the photo-electric cell 103 and reset by the output signal of the photo-electric cell 100, the difference of time determining the output voltage of the circuit is a measure for the angle of camber. The sign of the angle is determined from the polarity of the output voltage which again depends on which photo-electric cell (103, 100) is first lighted.

The measurement of toe-in, toe-out, respectively is effected in the same way by means of the photo-electric cells 101 and 102. Those cooperate with the circuit 110 which is set by the signal of the photo-electric cell 101 or of the photo-electric cell 102 and reset by the signal of the other photo-electric cell. In the situation represented in FIG. 9a — toe-in is equal to 0 — the signals of the photo-electric cells 101 and 102 coincide; in the situation according to FIG. 9b — positive toe-in — the photo-electric cell 101 will be lighted at first by the lamp 106 whereby the circuit 110 is set and, after a particular time, depending upon the toe-in, the photo-electric cell 102 will be lighted by the line of light, whereby the circuit 110 is reset. The output signal $Vu'$ is a measure of the difference of time $t_2' - t_1'$ between the moment at which the output signal of the photo-electric cell 102 and the moment at which the output signal of the photo-electric cell 101, respectively, is produced; at a constant speed of the disc 90 this output signal represents the toe-in.

Figure 13:
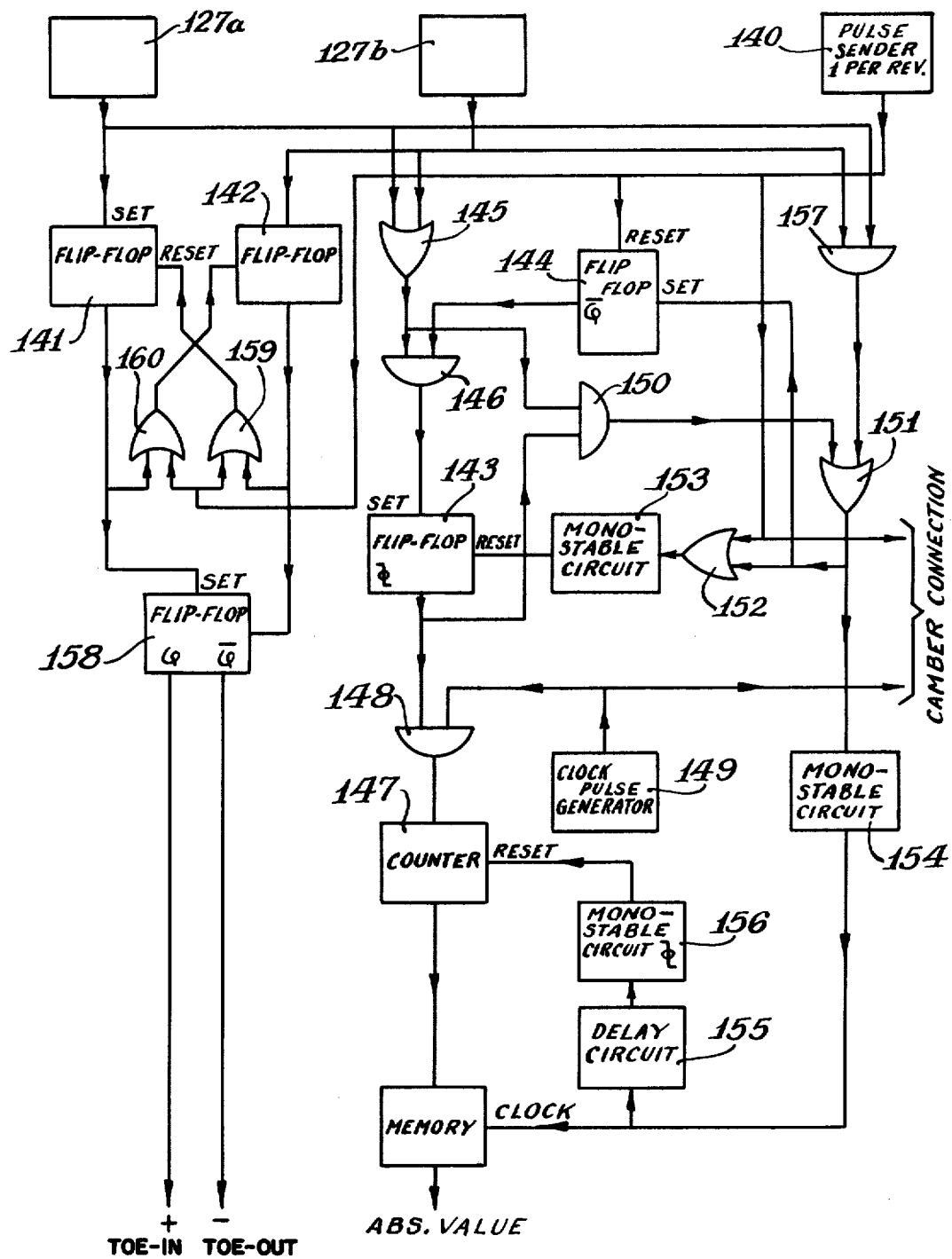
FIG. 13 shows a block diagram of the electronic circuits used in the embodiment of FIG. 11.

It is possible to perform a relative movement (scanning) along a straight line. The FIGS. 11, 12 and 13 illustrate such an embodiment.

FIG. 11 shows an arrangement with a projector 120, and disc 121 disposed in front thereof, the disc being driven in rotation by a motor (not shown) and cooperating with the mirror 122 which is perpendicular to the axle 123 of the wheel 124. FIG. 12 shows a front view of the disc 121 in which two curved slits 125, 126 are provided; the shape of these slits can be described in pole coordinates as $R = \pm K\phi$, in which $K$ is a constant. Behind the disc 121 are four oblong, fixed light sensitive elements, denoted by the reference numerals 127a and 127b, respectively (for the vertical elements), and 128a and 128b, respectively for the horizontal elements.

These light sensitive elements may for example be constructed from conducting fibers cooperating with a collecting lens 135 arranged in front thereof and a photo transistor 136. When an element at some point along the length is struck by light falling thereon the incident radiation will be thrown via the collecting lens 135 on the photo transistor 136 which emits an output signal.

The projector 120 projects two pairs of lines of light disposed at an angle with the horizontal and vertical, respectively, viz., the pair of lines 129a, 129b and the pair of lines 130, 130b. The whole is adjusted in such a way with respect to the mirror that in the neutral position of the mirror 122, that is to say camber zero and toe-in zero, and consequently with the plane of the mirror vertical and parallel to the longitudinal axis of the vehicle, while the axis of the projector is perpendicular to the longitudinal axis of the vehicle, the situation of the lines 129a, 129b reflected via the mirror 122 is symmetrical with respect to the horizontal, vertical, respectively through the projection center.

FIG. 12 illustrates this situation drawn by the full lines 129a, 129b and the dash lines 130a', 130b'.

When the position of the wheels deviates from the position as described above the location of the lines 129a, 129b, 130b, 130 will deviate from the starting position. When the wheel has a positive camber then the reflections of the lines 129a, 129b will lie lower than the position shown in FIG. 12; in case of a positive toe-in angle they will lie as indicated by the lines 130a, 130b. The displacement of these lines of light is observed by scanning through the slits 125, 126 in combination with the light sensitive elements. When the disc turns at a constant speed in the direction of the arrow 132, the images along the light sensitive elements are scanned at a uniform speed and the time which lapses between the detection of light pulses by the pairs of photo sensitive elements is a measure for the toe-in, angle of camber, respectively. The advantage of this embodiment is that no deviations as to linearity are produced and no collector rings are required; the system, however, is dependent on the distance between the elements.

The operation is clarified with reference to the diagram of FIG. 13.

It is assumed that for each revolution of the disc 121 a pulse is sent by a pulse sender 140 at the moment at which the slits are not in front of any of the light sensitive elements. This pulse sender, not indicated in FIGS. 11 and 12, may, e.g., be a photo-electric cell in combination with a source of light and an opening in or a contrasting line on the disc. After the pulse of the pulse sender 140, which resets the flip-flops 141, 142, 143, 144, the photo-electric cell of the element 127a will emit a pulse if a toe-in angle is to be measured which is the situation represented in FIG. 12. At the rear edge of that pulse, the flip-flop 143 is set after the OR gate 145 and the AND gate 146, whereupon the counter 147 via the AND gate 148 can start counting the pulses from a clock generator 149 of pulses.

When the flip-flop 143 changes over, the AND gate 150 opens, whereby at the next pulse-in this case from the photo-electric cell 127b via the OR gates 151, 152 and the monostable circuit 153, the flip-flop 143 is reset.

The duration of the pulse of the monostable circuit 143 is selected to be longer than that of the pulses from the photo-electric cells of the elements 127a, 127b in order to prevent the flip-flop 143 from being set again at the rear edge of the second pulse. The result obtained by counting and representing the angle measured is available at the output of the counter. On the front edge of the reset pulse at the output of the OR gate 151, the monostable circuit 154 is triggered, which causes the counter memory to read in. The rear edge of the read-in pulse triggers, via the delay circuit 155, the monostable multivibrator 156 which in turn resets the counter 147.

The result of counting is now available in the memory until a next count is read in.

In order to avoid the possibility that after a half revolution of the disc another measurement would be made with a poorer resolution (in dependence of the angle at which slits and projected lines intersect) the flip-flop 144 can be set by means of the reset pulse from the OR gate 151, whereupon the AND gate 146 is closed. Only after the pulse from the pulse sender 140, which then also must reset the flip-flop 144, is the AND gate opened again. When the measured angle is so small that the pulses from the photo-electric cells of the elements 127a and 127b overlap each other, a reset pulse is sent, via the AND gate 157, to the flip-flop 143 so that the same is not set.

The sign of the angle is determined by the state of the flip-flop 158. This state is determined by the flip-flops 141 and 142 according to the succession of the pulses from 127a or 127b. This flip-flop, which is first set, blocks the changing over of the other flip-flops via the OR gates 159, 160, respectively.

The circuit for measuring the camber angle is quite identical to that for measuring the toe-in angle and therefore not shown.

As mentioned, the embodiment described above requires a fixed space between the projector and the disc on the one hand and the wheel mirror on the other hand; the system is dependent on distance while the speed of rotation of the disc should have a fixed value. These difficulties are obviated with an embodiment whereby not only the difference in time between the moments in which two pulses are produced is measured but whereby pulses are counted.

Figure 14B:
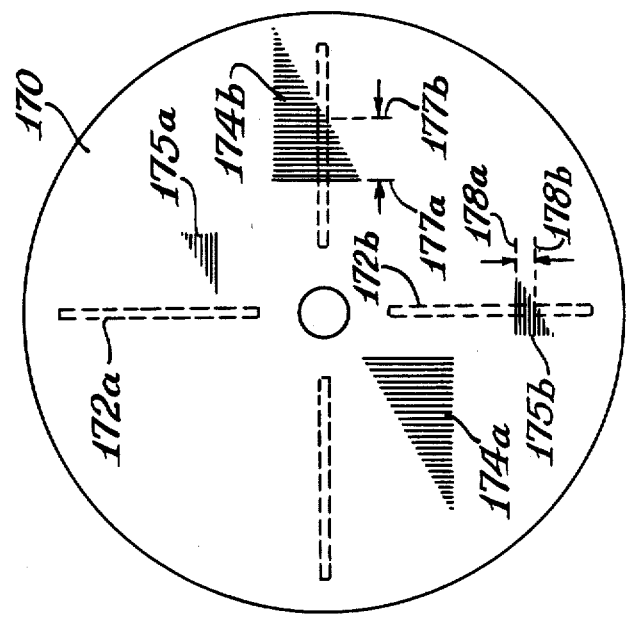
FIGS. 14a and 14b show a variant of the measuring lines configuration used in the embodiment according to FIGS. 11 and 12.
Figure 14A:
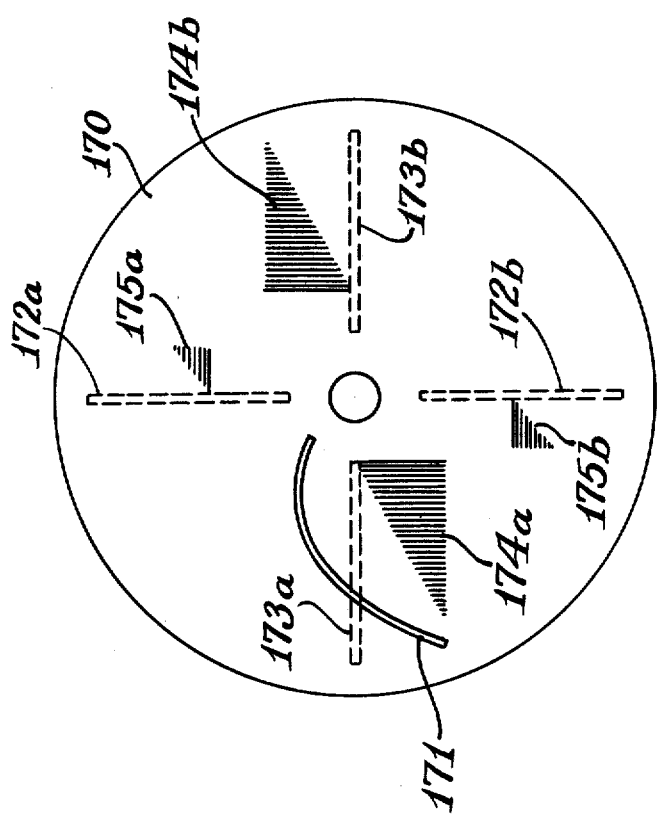

FIGS. 14a, 14b show a front view of a disc 170 of the general kind as the disc 121 in which is formed a curved slit 171, the shape of which can be expressed in radial coordinates by $R = K\phi$. Behind the disc are two pairs of light sensitive elements, viz., the vertical pair 172a, 172b and the horizontal pair 173a, 173b. These light sensitive elements are constructed as described hereinbefore in relation to the elements 127, 128.

The projector now projects, via the wheel mirror a number of configurations consisting of vertical, horizontal lines respectively within wedge shaped limits. The vertical lines are situated within the wedges 174a, 174b and the horizontal lines are situated within wedges 175a, 175b.

FIG. 14a shows the location of the pattern configurations when the wheel mirror is vertical and parallel to the longitudinal axis of the vehicle.

FIG. 14b shows the situation when the front wheels have a positive camber and toe-in. The pair of pattern configurations 174a, 174b is shifted downwardly with respect to the situation according to FIG. 13a, while the pair of configurations 175a, 175b is shifted upwardly. This means that on rotation of the disc whereby scanning of the configurations is effected through the slit 171, the light sensitive element 173b will be lighted a number of times which corresponds with the number of lines of light situated within the limits 177a, 177b, while the light sensitive element 172b will be lighted a number of times corresponding to the number of light lines contained within the limits 178a, 178b. The number of impulses sent by one of the light sensitive elements 172a, 172b determines therefore the magnitude of the camber angle, while the sign of this angle is determined by the answer to the question which of the two light sensitive elements has sent pulses; the same applies to the magnitude and the sign of the toe-in angle in relation to the light sensitive elements 173a, 173b.

It is evident from the foregoing description and teaching that the designing of suitable electronic circuits to perform the desired operation is within the ability of persons skilled in the art.

An embodiment in which the projector likewise projects a line configuration on the wheel mirror reflecting this configuration, but wherein the scanning of the reflected lines is not effected according to a straight line, but according to a curved line, is illustrated with reference to the FIGS. 15, 16, 17a and 17b.

Figure 15:
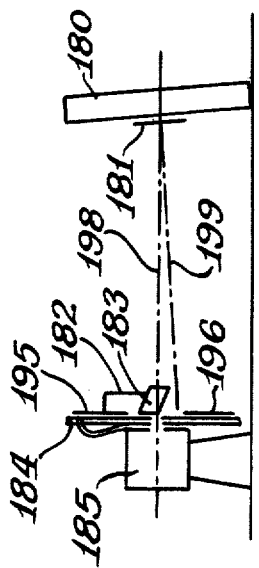
FIG. 15 shows a side elevation of still another embodiment.

FIG. 15 shows in front of the vehicle wheel 180, to which is secured the wheel mirror 181, perpendicular to the axis of rotation thereof, a system consisting of a projector 182, a slanted mirror and a disc 184, constituting the image plane and an electrical scanner — and a mechanical driving system accomodated in the housing 185. Two lamellas 195, 196 are placed before the disc.

Figure 16:
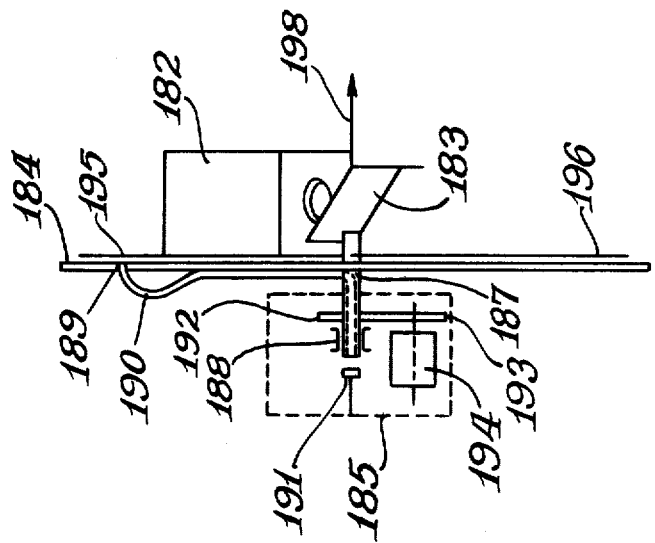
FIG. 16 shows to an enlarged scale the scanning and projection apparatus applied thereto.

FIG. 16 shows a side elevation on an enlarged scale of the projector and scanning system. The figures 17a and 17b show a front view of the disc with the lamellas. The disc 18 is supported by the hollow shaft 187 which is supported in the bearing 188; the disc is perforated at the location 189 and through this opening protrudes the end of the light conductor 190, the other end of which goes through the hollow shaft 187 and opens at a short distance before the photo-electric cell 191. Via the transmission 192, 193 the disc can be driven in rotation by the motor 194. Before the disc are disposed two lamellas 195, 196 each covering an angle of 90°, the purpose thereof will be discussed hereinafter. The projector 182 is disposed in such a way and the mirror is arranged in such a manner that the direction of projection is coaxial with the shaft 187 and perpendicular to the plane of the disc 184. This direction of projection is denoted by the reference numeral 198 in FIG. 15; the reflected ray is denoted by the reference numeral 199.

The projector projects a configuration consisting of two groups of horizontal lines 200, 201 situated on either side of the horizontal, and two groups of vertical lines 202, 203, situated on either side of the vertical. The whole is adjusted in such a way that, when the plane of the front wheels is vertical (camber = o) and parallel to the longitudinal axis of the vehicle (toe-in = o) the left hand limit of the group 202 and the right hand limit of the group 203 coincides with the vertical through the center of projection, while the lower limit of the group 201 and the upper limit of the group 200 coincide with the horizontal. FIG. 17a shows this situation.

Dependent on the toe-in and the camber, the groups will be displaced with respect to the horizontal, the vertical, respectively. FIG. 17b shows the situation for a front wheel with positive camber and a positive toe-in, the groups 200 and 201 are shifted downwardly and the groups 202 and 203 are shifted to the left (depicted in the situation of a system disposed, as seen in the direction of travel, in front of the right hand front wheel).

The toe-in angle is determined by the number of light lines between the vertical limits 204 and 205 and the camber angle is determined by the number of light lines between the horizontal limits 206 and 207. The horizontal and vertical limits, respectively, of the lamellas 195 and 196 constitute the references with respect to which the lines are counted. Those lines situated outside of the limits are scanned by the scanning opening 189 which in the situation according to FIG. 17a does not perceive light lines at all and in the situation according to FIG. 17b perceives a number of light lines of the vertical group and a number of light lines of the horizontal groups.

It should be known during the scanning which configuration is scanned, in other words, there should be some information available about the location of the light scanning opening 189 (first, second, third or fourth quadrant, camber of toe-in measurement). This information can, e.g., be obtained by providing on the back side of the disc a division into light or dark parts which are scanned by a photo-electric cell or by a number of reed switches to be arranged along the circumference of the disc, which are excited by a magnet mounted on the disc.

The embodiment described above has the appreciable advantage that it is not dependent on distance, while the distortion owing to oblique projection gives only rise to an error of the second order. The count is not influenced by the shape of the path of the light scanning opening 189 nor by a non-constant speed of rotation of the disc.

Figure 18:
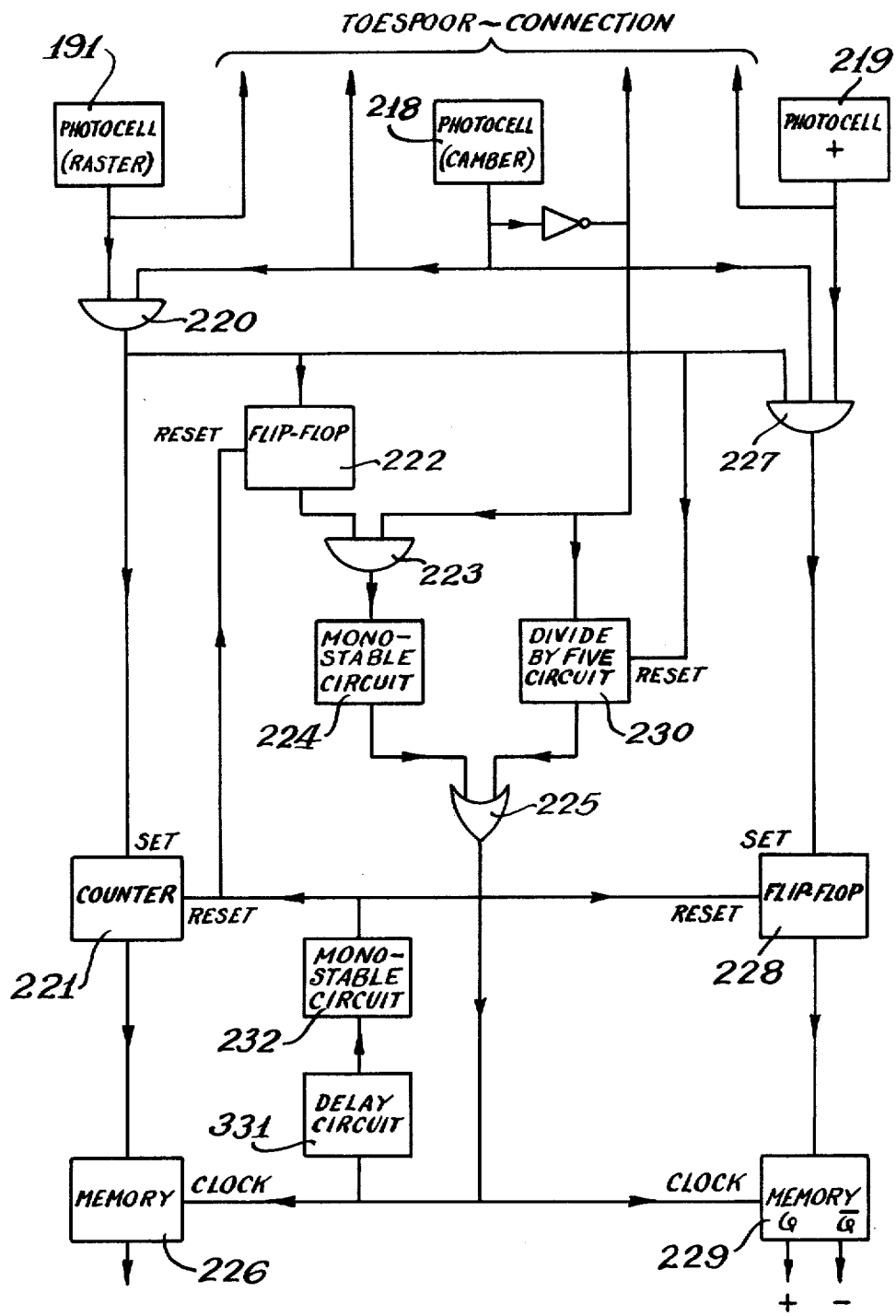
FIG. 18 shows a block diagram of the electronic circuits in accordance with the embodiment of FIG. 15.

The electronic circuits are illustrated by FIG. 18 which represents the block diagram of the electronic circuits related to the measurement of the camber; the electronic circuits used for the measurement of the toe-in are quite the same and therefore need not be discussed.

It is assumed that, during the rotation of the disc, dark and light surfaces on, e.g., the back side of the disc are scanned by two photo-electric cells 218 and 219 so that information is supplied about the position of the disc, while it is indicated whether the count taken relates to a measurement of camber or to a measurement of toe-in and to a positive or a negative angle, respectively. It is assumed that 1 level of the cell 218 indicates that a measurement of camber is made and a 1 level of the cell 219 indicates that a positive angle of camber is measured.

On determining the camber, the AND gate 220 is kept open by the signal of the cell 218. The count pulses from the cell 191 which is excited by light, received by the light scanning opening 189 and conducted via the light conductor 190 to this cell, are recorded via the gate 220 by the counter 221. If pulses are counted then the flip-flop 222 is set, whereby the AND gate 223 is opened and at the first switch-over to toe-in, toe-out measurement the monostable multivibrator 224 is triggered via the inverted signal of 218. Via the OR gate 225 the result of the count is read into the memory 226 where it is available to the next read-in. If the camber angle measured is a positive angle and the AND gate 227 is opened by the cells 218 and 219, at the first counting pulse from the gate 220 the flip-flop 228 tips over.

At the already aforementioned read-in command, coming from the OR gate 225, the output condition of the flip-flop 228 is, together with the result of the count, read into a memory element 229 whereby the sign output concerned is energized.

A level switch-over of the cell 218 to a toe-in measurement is treated in a divider-by-five circuit 230. At a pulse from the gate 220, as a consequence of the detection of a line from the camber screen, the five-divider circuit is reset. If in none of the two quadrants concerned a camber line is found (camber = o°) then the divider-by-five circuit will, at the first switch-over to toe-in measuring, feed a pulse to the OR gate 225 whereby also in this case the memories are read in. The result of the count is now evidently naught. One of the sign outputs remains energized. When the latter circumstance is deemed undesirable, this can be prevented at the cost of an additional memory element.

It should be noted that the counter and the flip-flops after reading-in the memories are reset via the delay circuit 231 and the monostable multivibrator 232.

Figure 19:
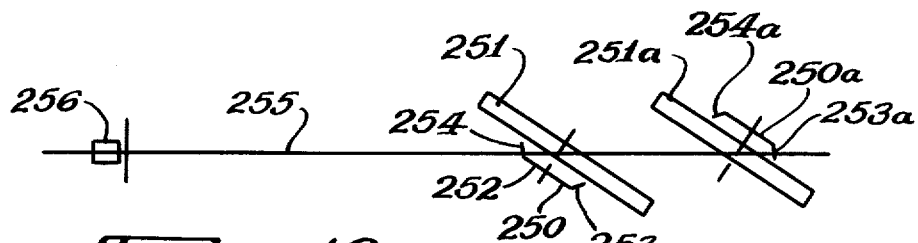
FIG. 19 illustrates the principle of the caster measurement.

It is known per se that the castor of the front wheels can be deduced from a measurement of the camber executed for the front wheels, which are turned to the left and the right respectively through a certain angle. A three sided mirror is used so that also in case of deflected wheels a mirror surface can be disposed parallel to the longitudinal axis of the vehicle and reflection is possible. FIG. 19 shows in plan view one illustrative example of such an arrangement.

The mirror 250 has a part 252 which is perpendicular to the axis of the wheel 251 and two parts 253, 254 which are at an angle therewith. The wheels 251, 251a are now turned to the left to an extent such that the part 254 is perpendicular to the optical axis 255 of the system: projector-image plane scanning system 256. Then the measurement of the camber is taken in the usual way. Thereupon the wheels are turned to the right and the measurement of the camber is repeated while utilizing the mirror part 253. Thereupon by means of the sides 254a, 253a of the mirror 250a corresponding measurements of the camber are made for the wheel 251 by a measuring apparatus (not shown) provided on the side of that wheel. The castor of that wheel can be derived from the results of the two measurements per wheel.

Figure 20:
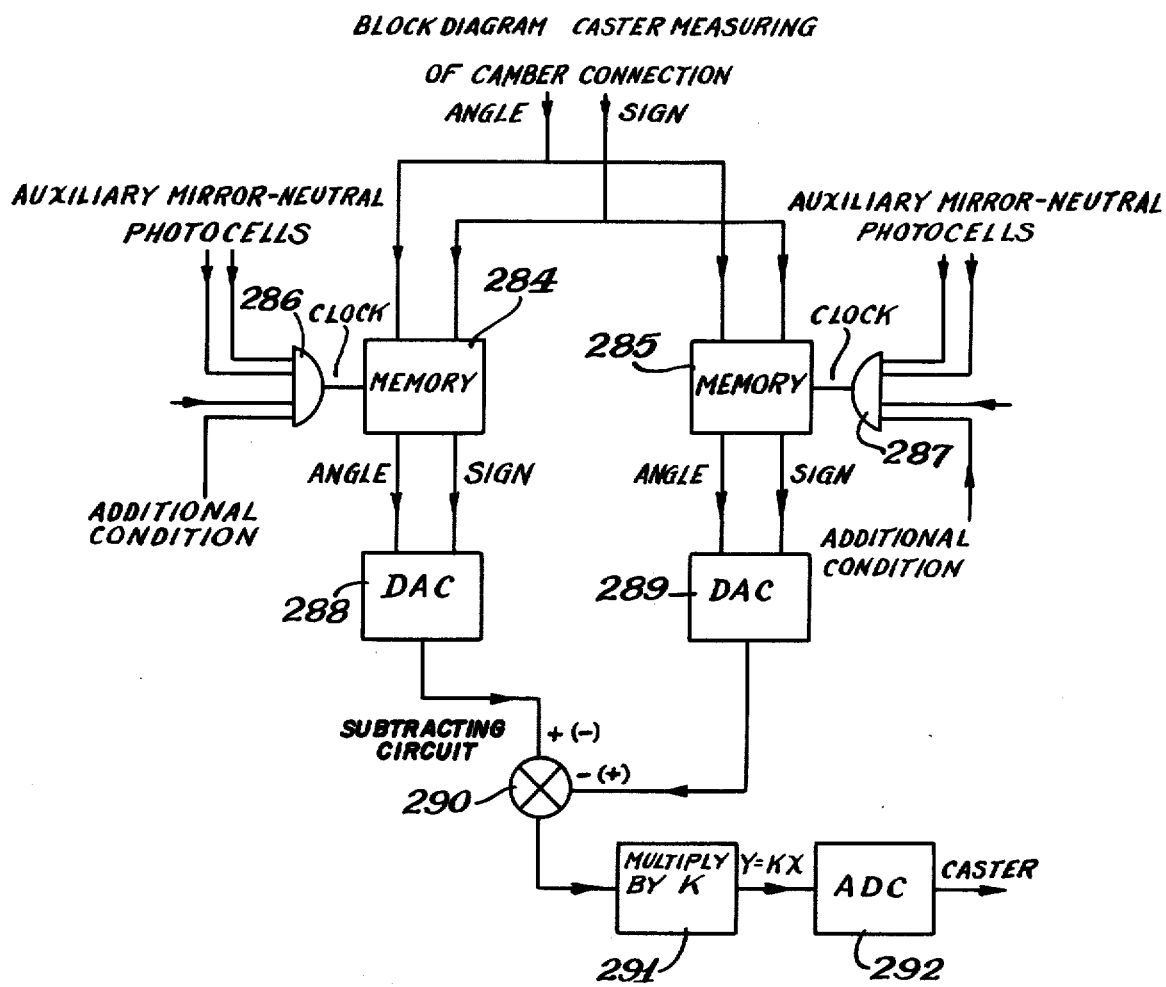
FIG. 20 shows a block diagram of the electronic circuits used in the caster measurement.

FIG. 20 shows a blocks diagram of the electronic circuits which can be used in combination with the above described embodiment for measuring the castor angle. The operation is in brief as follows:

The measured values of the wheel in question with the respective sign from the normal camber memories are, after a number of conditions have been satisfied, read into two additional memories 284, 285. The conditions are symbolized by the AND gates 286 and 287. These conditions comprise, among other things, the lighting of two additional photo-electric cells by which it is indicated that the steering wheel has been turned through the correct angle. The memory 248 is read-in when the steering wheel has been turned to the left and the memory 285 is read-in when the steering wheel has been turned to the right.

More precautionary measures should be used: the two photo-electric cells should remain lighted during the measurement and not only during the reading-in (e.g. reading-in at second pulse of the clock in the system according to FIG. 18 and continuous lighting of the cells, whereupon a further transfer of information is forbidden). It is possible to ascertain by simple means whether the steering wheel has been turned to the left or to the right. The information stored in the memories 284 and 285 can, e.g., be analogously treated via a digital analog converter 288, 289. By deducting the voltages obtained in this way from each other in the circuit 290 and multiplying them subsequently by the desired factor in the circuit 291 the result is available in analog form. This result can, if desired, again be brought into digital form by means of an analog-digital converter 292.

The aforementioned measuring systems lend themselves very well for the application to modern, program operated diagnosis systems for vehicles.

What is claimed is:

1. A device for measuring the wheel angle on vehicles comprising an optical system including a projector, cooperating with the related wheel, for forming on an image plane an optical pattern consisting of one or more marks, at least one light sensitive element situated in the image plane, means for effecting relative movement between said light sensitive element and the mark (s) of said pattern, respectively, caused by an angular displacement of said projector with respect to a reference position, said relative movement causing signals to be generated in reference positions for enabling the wheel angle concerned to be determined, characterized in that by means of a suitable pattern, projected by the projector, on the light sensitive element, signals are generated which are counted for directly determining the wheel angle.

2. A device according to claim 1, characterized by a projector for projecting, via a mirror, a plurality of equidistantly spaced marks on the image plane which is situated on the same side as the mirror, and which image plane contains at least one light sensitive element for receiving said marks, and means for providing relative movement between the projector and the image plane and the mirror, through a limited angle around an appropriate axis.

3. A device according to claim 2, characterized in that said mirror is coupled to the wheel and the image plane in front of the projector so as to be perpendicular to the wheel axis and movable around a horizontal optical axis of the projector, said image plane containing two light sensitive elements situated on a horizontal line through the optical axis of the projector, the first light sensitive element of which cooperates with marks arranged in a vertical row and the second light sensitive element of which cooperates with a reference mark, such that when the optical axis in one direction is perpendicular to the surface of the mirror, the reference mark falls on the second light sensitive element for generating a first reference signal, and means to generate a second reference signal when the optical axis is in the horizontal position.

4. A device according to claim 1, characterized by two mirrors each coupled perpendicularly to the wheel axis of one wheel of a pair, each of said mirrors cooperating with a respective one of two optical projectors the optical axis of which is substantially perpendicular to the longitudinal axis of the vehicle, and each mirror cooperating with a light sensitive element situated in an image plane which is perpendicular to the optical axis of the projector, the light sensitive elements being situated on a vertical line through the optical axis, at least one of the projectors projecting a horizontal row of equidistantly spaced marks such that in a mutually perpendicular position of the wheel mirror and the optical axis, the initial mark of the horizontal row of marks falls on the associated light sensitive element, the other projector projecting at least one reference mark which in a mutually perpendicular position of the optical axis of this projector and the wheel mirror falls on its associated light sensitive element.

5. A device according to claim 4 characterized in that the two optical projectors respectively project first and second rows of equidistantly spaced marks, the last mark of the second row of marks which is directed opposite to the first row of marks forming said reference mark.

6. A device according to claim 5, characterized by a mirror coupled perpendicularly to the axle of the wheel, the angle of which is to be measured, an optical system arranged in front of the mirror and comprising at least one light sensitive element, said optical system being rotatable around its optical axis in a vertical plane, a projector which projects on the mirror a pattern configuration situated in a vertical plane, the pattern configuration comprising groups of mutually parallel lines with at least two groups parallel to one axis of a system of rectangular coordinates having horizontal and vertical axes, and situated on either side of this axis, said light sensitive element, in response to the passage of said lines thereover, generating output signals to be supplied to a counter, means for generating a reference signal when the light sensitive element passes by the horizontal and vertical axes of the system of coordinates and means for supplying information indicating the presence of the light sensitive element in one of the quadrants of said system of rectangular coordinates.

7. A device according to claim 6 characterized by two or more screen members, situated in a vertical plane and extending over a certain distance on either side of the horizontal and vertical axes of the system of coordinates, the reference signal being generated by the light sensitive element on passing by the edge of a screen member, which is situated on the horizontal and vertical axes, respectively.

8. A device according to claim 6 characterized in that the projector projects the pattern image on the wheel mirror via a mirror disposed at an angle with the optical axis.

9. A device according to claim 6 characterized by a disc rotatably driven around the optical axis, the front surface of said disc abutting one end of a light conductor, the other end of the light conductor member being placed opposite at least one light sensitive element.

10. A device according to claim 4 characterized in that the marks consist of vertical lines.

11. A device for measuring wheel angles on vehicles comprising an optical system cooperating with a related wheel for forming a pattern of one or more marks on an image plane, with at least one light sensitive element situated in the image plane and with means for causing a relative movement between said light sensitive element and the mark pattern, means during said relative movement for generating signals from which the related wheel angle can be derived, characterized in that said relative movement is provided by moving the light sensitive element with respect to the image formed on the image plane such that signals are obtained from the light sensitive element representative of the wheel angle to be measured.

12. A device according to claim 11 characterized in that the movement of the light sensitive element with respect to the marks follows a curved path.

13. A device according to claim 12 comprising a mirror coupled perpendicularly to the axle of the wheel the angle of which is to be measured, an optical system arranged in front of said mirror and having at least one light sensitive element, said optical system being rotatable in a vertical plane around an axis perpendicular to the longitudinal axis of the vehicle and at a predetermined constant speed for scanning an image projected on the plane, said image comprising at least one horizontal and at least one vertical, line-shaped mark which are projected in such a way that in a vertical position of the mirror, and when the latter is parallel to the longitudinal axis of the vehicle, the point of intersection of the horizontal and vertical marks lies on the axis of rotation.

14. A device according to claim 11 characterized by a mirror coupled perpendicularly to the wheel axle of its associated wheel an optical system arranged in front thereof and consisting of at least two oblong light sensitive elements, situated on either side of the optical axis thereof, with a disc placed in front thereof and rotatably driven around an axis which coincides with the optical axis of the system, at least one slit in the surface of the disc and extending from the central part of the disc towards the edge with a curved shape such that, when the disc is rotated uniformly, a linear scanning as to time is obtained, a projected adapted to project on the mirror a system of configurations distributed symmetrically around the optical axis, the arrangement being such that the location of the reflection thereof by the mirror on the rotating disc, constituting the image plane, with respect to the light sensitive element represents the wheel angle to be determined.

15. A device according to claim 14 characterized in that said configurations consist of at least two lines, respectively situated on either side of the axis of projection and intersecting in the same point at identical angles a line, situated in a vertical plane, through the optical axis.

16. A device according to claim 14 characterized in that said configurations consist of at least two groups of mutually parallel lines, the groups being respectively situated on either side of the center of two diagonally opposite quadrants of a system of rectangular coordinates with horizontal and vertical axes, respectively, and extending through the optical axis, the lines of each group being perpendicular to an axis of the system of coordinates and each group on the side which is turned towards this axis being delimited by a line intersecting the relative axis at an identical angle.

* * * * *